United States Patent Office
3,556,678
Patented Jan. 19, 1971

3,556,678
METHOD AND APPARATUS FOR LOW FREQUENCY SYNCHRONOUS STARTING OF REVERSIBLE PUMP TURBINES
Asao Oishi and Shozoo Sashino, Hitachi-shi, Japan, assignors to Hitachi, Ltd., Tokyo, Japan
Filed June 2, 1969, Ser. No. 829,677
Claims priority, application Japan, June 3, 1968, 43/37,538
Int. Cl. F04d *13/02*
U.S. Cl. 417—53          3 Claims

ABSTRACT OF THE DISCLOSURE

A method and apparatus for the low frequency synchronous starting of pump turbines, in which in order to shorten the time before the pump has acquired a necessary rotational torque, the guide vane opening of a water turbine is progressively increased incident to increase in r.p.m. of the pump runner so as to increase the pump driving torque close to the allowable maximum torque of said pump.

---

The present invention relates to a method and apparatus for the low frequency synchronous starting of reversible pump turbines.

The methods used for starting the pumping operation of reversible pump turbines in a pumping-up power plant are classified into a damper starting method using an induction motor, a starting motor direct-connection starting method which is similar to the damper starting method in respect of using an induction motor but is different from the latter in that a small poney motor is used which is different in type from that used in the latter, and a synchronous starting method in which the pump turbines are started synchronously with a generator by means of a motor electrically connected to said generator.

The damper starting method has the drawback that a large current of low power factor occurs at the time of starting, causing a disturbance of the system, whist the starting motor direct-connection starting method has the drawback that a small induction motor must be provided on top of the dynamotor in direct connection therewith, which adds to the cost of the system.

The synchronous starting method has many advantages over the aforesaid two methods in that while there is required a generator or the like for starting the pumps, the disturbance of the system is less than those of the latter and in that the starting time can be shortened owing to the fact that the starting torque can be made large to some extent.

The object of the present invention is to give a torque from a generator to a pump driving motor as effective torque close to the allowable maximum torque of the motor, in the low frequency synchronous starting of reversible pump turbines.

According to the low frequency synchronous starting method which has been used as a method of starting a plurality of reversible pump turbines, installed in a pumping-up power plant, for pumping operation, one of the reversible pump turbines is eletcrically connected beforehand with one or a plurality of the other reversible pump turbines in the stationary state of said pump turbines, whereby when said one pump turbine is operated for generating power, the other pump turbines in electrical connection therewith are started synchronously by the power from said power-generating pump turbine.

Figure 1:
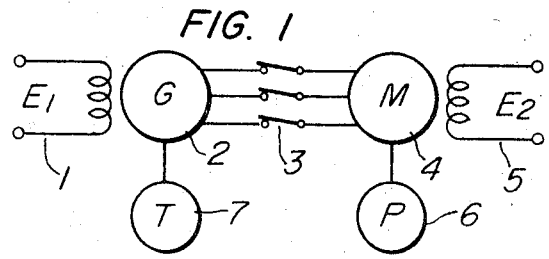
FIG. 1 is a schematic diagram illustrating the principle of the synchronous starting method according to the present invention.

Namely, as shown in FIG. 1, a generator 2 and a motor 4 are electrically connected with each other in the stationary state and a water turbine 7 is placed in operation to drive the generator 2 by exciting their coils 1 and 5. Whereby the motor 4 is driven synchronously with the generator 2 to start a pump 6 directly connected therewith through feeder lines 3.

In practicing the low frequency synchronous starting method as described above, it becomes necessary to limit the allowable maximum torque to be given to the pump driving motor 4 from the starting generator 2 within a range to ensure a smooth operation of the motor. Namely, if the output of the generator 2 is made abruptly large to start the pump 6 which requires a large force for starting, the result will be only that the motor 4 is forced to operate immoderately or the motor steps out without being able to synchronize with the frequency from the generator 2. Furthermore, the allowable maximum torque is constant irrespective of the r.p.m. of the pump as represented by the line A in FIG. 2.

With regard to the torque T generated by the pump driving motor 4, the following equations are established:

$$P=QH$$
$$\omega=2\pi N/60$$
$$T=P/\omega=60P/2\pi N \qquad (1)$$

wherein P stands for a pressure imposed on the runner of the turbine 7, H a head (lift), Q a quantity of flow, N the r.p.m. of the runner and $\omega$ the angular speed of the runner.

Figure 2:
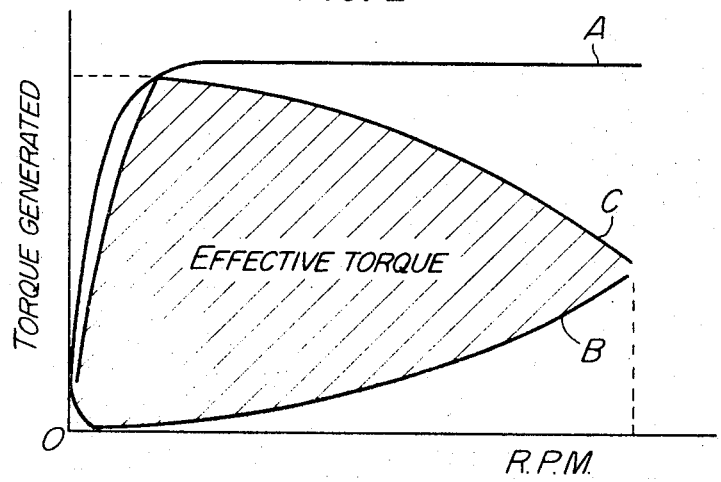
FIG. 2 is a diagram graphically showing the torque characteristic of a conventional low frequency synchronous starting method.

Therefore, when the opening of the guide vanes (discharge quantity regulating members) of the water turbine 7 is constant, the pressure P imposed on the runner becomes constant and the torque T generated by said water turbine decreases as the r.p.m. N of the runner increases as indicated by the curve C in FIG. 2. The curve B in FIG. 2 represents the resisting torque of the generator 2 and the motor 4, which is large at the time of starting due to the statical friction of the runner in the stationary state but becomes progressively small after the generator and the motor have been set in motion, as the dynamical friction decreases. Thereafter, the resisting torque increases as the r.p.m. increases.

For the foregoing reason, it has been the case that the effective torque for driving the pump 6 decreases as the r.p.m. of the pump runner increases and, since the pump 6 is driven and accelerated by a torque lower than the allowable maximum torque, a lengthy time is required before the pump 6 has started pumping or the pump has acquired a necessary rotational torque.

Figure 3:
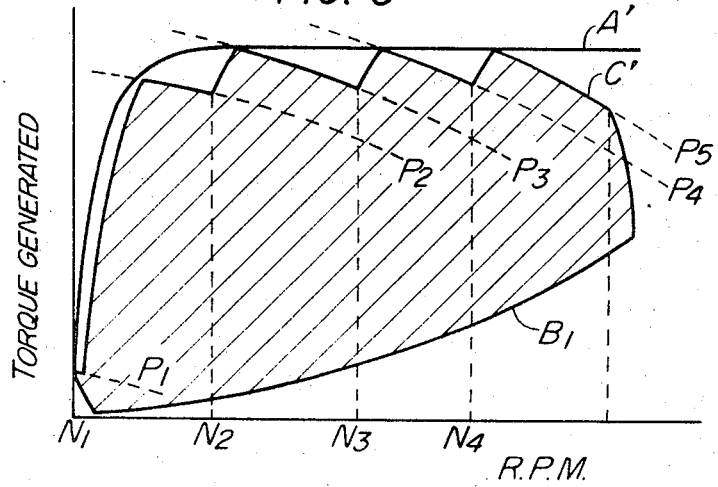
FIG. 3 is a diagram graphically showing the torque characteristic of the low frequency synchronous starting method according to this invention.

In view of the above, according to the present invention the driving torque of the pump driving motor 4 is made large within the allowable maximum torque range by getting the curve C′, representing the pump driving effective torque, close to the curve A′ representing the allowable maximum torque, as shown in FIG. 3, thereby to shorten the time required for the pump driving motor to acquire the necessary rotational torque.

Figure 5:
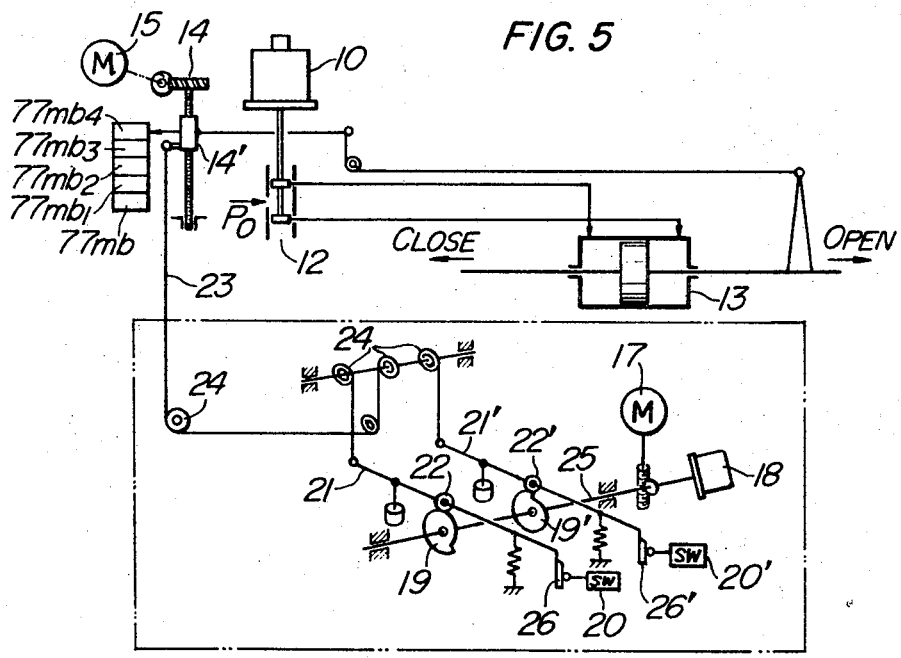
FIG. 5 is a diagram showing the outline of an embodiment of the low frequency synchronous starting apparatus according to the invention.
Figure 6:
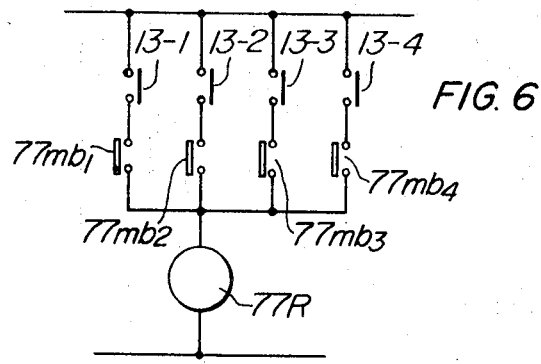
FIG. 6 is an electric connection diagram of the apparatus shown in FIG. 5.
Figure 7:
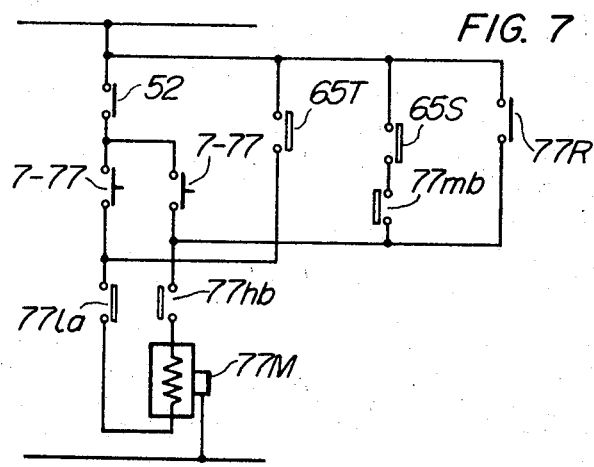
FIG. 7 is a wiring diagram including the circuit of 77R shown in FIG. 6.

A preferred embodiment of the present invention is shown in FIGS. 5, 6 and 7. Referring to these drawings, reference numeral 10 designates an actuator solenoid, 12 a pressure distribution valve, 13 a servomotor for operating the guide vanes, 14 a gate limiter by which the guide vanes are progressively opened simultaneously and 15 a motor for driving the gate limiter 14.

In the inoperative state of the apparatus, speed switches 13–1 to 13–4 are opened, while guide vane opening-responsive switches $77mb$ and $77mb_1$ to $77mb_4$ are closed. Consequently, an opening signaling relay 77R is held in an open position. A switch 65T is open which is adapted to be closed upon receiving a stop signal, and a guide vane full-closure protecting switch $77la$ is also open, said protecting switch $77la$ being so designed that it is opened only when the guide vanes are fully closed and is closed when the guide vanes are open even slightly.

Therefore, switch operating means 14′, shown in FIG. 5 and moved up and down by the gate limiter 14, is in a position to operate the lowermost switches $77mb$ to $77mb_4$ at first. The position shown in FIG. 5 of the operating means 14′ corresponds to the final open position of the guide vanes in a low frequency synchronous starting operation.

A switch 65S which is closed upon receiving a starting signal is open, and a switch 52 and a manual switch 7–77 to operate the gate limiter 14 are also open said switches 52 and 7–77 being connected in parallel with switch 65S.

Reference numeral 77M designates the coil of the gate limiter operating motor 15, which coil is held stationary with the operating means 14′ being held in a lowered position corresponding to the fully closed position of the guide vanes as described above, since a guide vane full-open protecting switch $77hb$ and the relay 77R or the switch 65S are open.

Now, when a starting signal is given under the condition described above, the switches 65S, $77mb$ and $77hb$ are closed, so that the coil 77M is excited driving the motor 15. The motor 15 operates the gate limiter 14 and the operating means 14′ of said gate limiter moves upwardly until it opens the switch $77mb$ at first. On the other hand, the actuator solenoid 10 is excited in response to the starting signal, give an upward force to the spool of the pressure distribution valve 12.

Thus, it will be seen that the spool moves upwardly following the upward movement of the operating means 14′ and stops at a point coinciding with the location where the operating means 14′ comes to stop to open the switch $77mb$. Incident to the upward movement of the spool, oil pressure $P_0$ moves the servomotor in an opening direction, so that the guide vanes are opened to a starting degree represented by $P_1$ in FIG. 3 and held immovably in that position. Namely, the switch $77mb$ is mounted in a position corresponding to the opening degree of the water turbine 7 shown in FIG. 1 by which the pump is started by the low frequency synchronous method.

With the guide vanes opened to the starting degree, the water turbine 7 and the pump 6 start rotating but not exactly simultaneously because the driving torque actually acts on the pump 6 a certain time after the opening of the guide vanes has reached the starting degree indicated by $P_1$ in FIG. 3. Such a time delay can be attributed to an electrical delay between the generation of power by the generator 2 and the receipt of the power by the motor 4, as well as to a mechanical delay necessitated by the fact that the pump 6 requires a large torque to be started in water and, therefore, does not operate instantaneously.

As the r.p.m. of the water turbine rises, with the opening of the guide vanes maintained at the starting degree $P_1$, the r.p.m.-responsive switch 13–1 is closed and the opening signaling relay 77R is closed since the opening-responsive switch $77mb_1$ is closed. Upon closure of the relay 77R, the coil 77M is excited, so that the gate limiter 14 is actuated to lift the operating means 14′ until said operating means opens the opening-responsive switch $77mb_1$. The servomotor 13 opens the guide vanes to a degree indicated by $P_2$ and ceases its operation. As the r.p.m. of the water turbine further rises and reaches a value of $N_2$ (at this point, as described previously, the effective torque for driving the pump 6 is smaller than the allowable maximum torque A′), the speed switch 13–2 is closed, so that the relay 77R is closed again and the guide vanes are opened to a degree $P_3$. Therefore, the discharge quantity is increased and the pressure P is increased accordingly, whereby the torque T is increased. In this case, the arrangement is made such that the increasing torque T gets as close to the allowable maximum torque as possible within the range not exceeding said allowable maximum torque, as indicated by the curve C′ in FIG. 3.

Thereafter, the r.p.m. of the water turbine further increases, with the opening of the guide vanes maintained at the degree $P_3$, and reaches a value of $N_3$, whereupon the speed switch 13–3 is closed and, therefore, the relay 77R is closed, so that the guide vanes are further opened to a degree $P_4$ and the torque T is again increased to get closer to the allowable maximum torque A′. The above-described operation is repeated until the pump runner acquires a necessary rotational torque.

Figure 4:
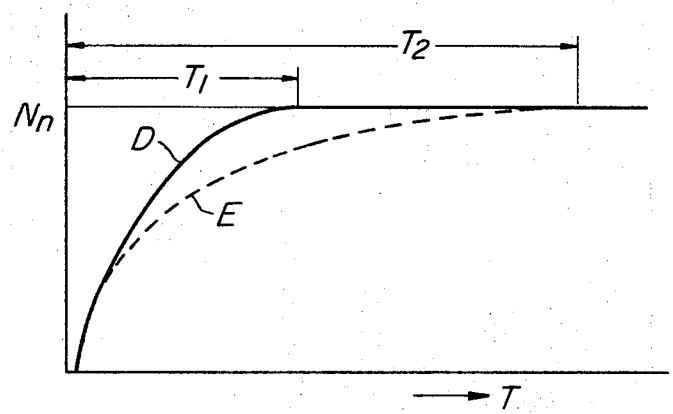
FIG. 4 is a diagram graphically showing in comparison the times before a pump runner has acquired a necessary rotational speed by the conventional and present low frequency synchronous starting methods.

By increasing the pump driving torque stepwise in the manner described to get it close to the allowable maximum torque A′, it is possible to make the effective torque for driving the pump 6 large within the range of the allowable maximum torque A′ as may be seen from a comparison between FIGS. 2 and 3, and thereby the time required for the r.p.m. of the pump runner to reach a necessary value of $N_n$ can be shortened from the time $T_2$ which the r.p.m. increase curve E according to the conventional method requires to reach the value of $N_n$, to the time $T_1$ which the r.p.m. increase curve D according to the present method requires to reach the same, as shown in FIG. 4.

When the pumping operation has been commenced upon completion of the low frequency synchronous starting of the water turbines, the connection between the generator 2 and the motor 4 is interrupted and the motor 4 is connected in parallel with the system for continuous operation. On the other hand, the water turbine 7 stopped by giving a stop signal to its circuit, because it is no longer necessary to operate the turbine or the turbine must be stopped for starting other pumps.

Namely, when the stop signal is given to the circuit of the water turbine 7, the switch 65T is closed and a reverse current flows through the coil 77M to rotate the gate limiter operating motor 15 in an opposite direction, since the guide vane full-closure protecting switch $77la$ is closed with the guide vanes open. At the same time, the actuator solenoid 10 is deenergized.

In more detail, the gate limiter 14 moves the operating means 14′ downward, so that the spool of the pressure distribution valve 2 is moved downwardly to operate the servomotor 13 with the oil pressure $P_0$ so as to maintain the guide vanes in their full closed position. In the downward movement, the operating means 14′ closes the guide vane opening-responsive switches $77mb_4$ to $77mb$. When the guide vanes have been fully closed, the switch $77la$ is opened, so that the motor 15 stops rotating and the operating means 14′ being moved downward by said motor also stops its movement. In short, the guide vanes are fully closed and the water turbine 7 stops rotating, preparing for the next power generating operation or low frequency synchronous starting operation. The manual switch 7–77 is to control the guide valve so as to place it in a desired position when the water turbines are operated in parallel connection, and its function and structure will not be described herein as they are obvious to those skilled in the art.

Figure 8:
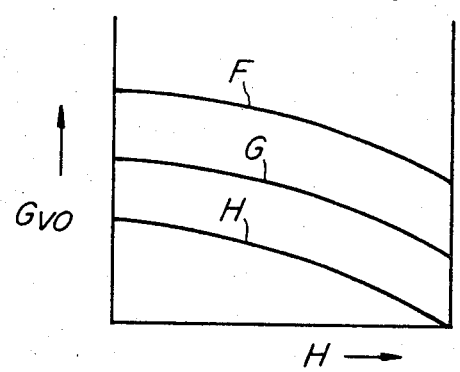
FIG. 8 is a diagram graphically showing the relationship between the head and the opening degree of discharge regulating means, with respect to the same torque.

In a pumping-up power plant, the head is largely variable and, therefore, the relationship between the torque generated and the opening degree of the guide vanes cannot be independent of the head and cannot be constant in case of the low frequency synchronous starting as well as in other cases. Namely, as shown in FIG. 8, the opening of the guide vanes can be smaller to obtain a constant torque F, G or H as the head becomes greater. This is because the pressure increases with the head, as may be understood from Equation 1 given previously.

In this view, it is of course necessary in the practice of the low frequency synchronous starting described herein to open the guide vanes at the rate corresponding to the head during the operation of getting the pump driving torque closer to the allowable maximum torque A' and for this purpose the guide vane opening-responsive switches $77mb$ to $77mb_4$ must be of the type which is provided with means for changing the opening rate of the guide vanes according to the head.

Such means for changing the guide vane opening rate according to the head is shown within the alternate long and two short dashes line at the lower portion of FIG. 5, and switches 20 and 20' correspond to the guide vane opening-responsive switches $77mb$ to $77mb_4$. The arrangement shown includes two switches and is designed for effecting twice the operation of getting the pump driving torque closer to the allowable maximum torque A', and so far as the description on this arrangement concerned, it should be understood that the switches $77mb$ to $77mb_4$ shown in FIGS. 5, 6 and 7 are not provided.

When the operating means 14' is moved upward in response to a starting signal, one end of floating levers 21, 21' are moved upwardly by a flexible wire 23 operatively connected thereto via sprockets 24, with the other ends thereof moving downward about the contact point between a cam 19 and a ring 22 and the contact point between a cam 19' and a ring 22' respectively, said rings 22, 22' being provided on said floating levers 21, 21' at a point intermediary of the length thereof and held in contact with said cams 19, 19' respectively. The cams 19, 19' are mounted on a common shaft 25 for rotation therewith and the shaft 25 is driven from a motor 17 which is set in motion in response to a signal from a head detecting device not shown. The cams 19, 19' are so shaped that the levels of the contact points between the cams 19, 19' and the rings 22, 22' are variable respectively according to the head and in no case are the distances between the shaft 25 and the respective contact points the same.

Therefore, even though the other ends of the floating levers 21, 21' are simultaneously caused to make a downward movement, the floating lever of which the distance between the shaft 25 and the contact point between the cam 19 or 19' and the ring 22 or 22' is shorter than the other precedes the other floating lever and opens, for instance, the switch 20 by an operating cam 26, prior to the switch 20', to stop the guide vane opening operation of the servomotor 13. Then, the switch 20' is opened when the r.p.m. of the runner has further risen. In other words, the guide vane opening rate according to the head is determined by the positions of the contact points between the cams 19, 19' and the rings 22, 22', which are variable owing to the different shapes of said cams 19, 19', and the rotational angle of the shaft 25 which is charged by the varying head.

With such means as described above, it is possible to change the guide vane opening rate in accordance with the head and thereby to obtain a constant torque required, independently of varying head.

Although in the embodiment described and illustrated herein the switches 13–1 to 13–4 are closed by reference to the r.p.m. of the water turbine which is operated for the generation of power, they may be closed by reference to the r.p.m. of the pump runner because in the synchronous starting operation the r.p.m. of the pump runner can be regarded as equal to the r.p.m. of the turbine runner. It will also be obvious that by increasing the number of the switches 13–1 to 13–4 and the switches $77mb_1$ to $77mb_4$ or, in other words, by increasing the frequency of the operations to get the pump driving torque of the motor 4 closer to the allowable maximum torque, the effective torque can be made large and accordingly the time before the start of pumping operation can be shortened.

What is claimed is:

1. A low frequency synchronous starting method for reversible pump turbines in a pumping-up power plant, in which one of the reversible pump turbines is operated as water turbine generator and the power generated by said water turbine generator is used for the low frequency synchronous starting of one or a plurality of other reversible pump turbines serving as water pumps, said method comprising increasing a torque to be given to a pump driving motor from a generator close to the allowable maximum torque of said pump driving motor.

2. A low frequency synchronous starting method as defined in claim 1 in which the torque to be given to the pump driving motor from the generator is controlled stepwise in such a manner as to bring it close to the allowable maximum torque of the pump driving motor.

3. An apparatus for the low frequency synchronous starting of pump turbines in a pumping-up power plant, in which one of the pump turbines is operated as water turbine and the power generated by a water turbine generator connected with said water turbine is used for the low frequency synchronous starting of one or a plurality of other pump turbines serving as water pumps, said apparatus comprising means for detecting the r.p.m. of the runner of the water turbine or the runner of the water pump rotating in a pumping direction, means for detecting the guide vane opening degree of said water turbine, means for increasing the guide vane opening degree of said water turbine to optionally selected predetermined degrees in response to a signal from said r.p.m. detecting means when the r.p.m. of the runner of said water turbine or the runner of said water pump has reached a predetermined value, means for tentatively holding the guide vanes against opening motion when the opening of said guide vanes has reached one of said optionally selected predetermined degrees and means for changing the opening rate of said guide vanes in accordance with the head, whereby the torque to be given to a pump driving motor from a generator is increased close to the allowable maximum torque of said pump driving motor.

References Cited

UNITED STATES PATENTS 3,185,440   5/1965   Hullman et al. _____ 103—207XR
3,447,473   6/1969   Hartland et al. _____ 103—87

ROBERT M. WALKER, Primary Examiner

U.S. Cl. X.R.

417—237, 411